United States Patent [19]
Mertl

[11] 3,795,493
[45] Mar. 5, 1974

[54] BEARING MATERIAL FOR DRY OPERATION OF THE SINTERED BRONZE TYPE

[75] Inventor: Klaus Mertl, Reinbek, Germany

[73] Assignee: Jurid Werke GmbH, Glinde near Hamburg, Germany

[22] Filed: May 25, 1971

[21] Appl. No.: 155,675

[30] Foreign Application Priority Data
June 6, 1970  Germany............................ 2027902

[52] U.S. Cl.................................. 29/182.5, 252/12
[51] Int. Cl. ......................... B22f 1/00, C10m 5/28
[58] Field of Search....................... 29/182.5; 252/12

[56] References Cited
UNITED STATES PATENTS

| | | | |
|---|---|---|---|
| 3,461,069 | 8/1969 | Waldhuter | 252/12 |
| 2,983,034 | 5/1961 | Humenik et al. | 24/182.5 |
| 1,479,859 | 1/1924 | Koehler | 252/12 |

FOREIGN PATENTS OR APPLICATIONS

| | | | |
|---|---|---|---|
| 456,467 | 5/1949 | Canada | 29/182.5 |

*Primary Examiner*—Carl D. Quarforth
*Assistant Examiner*—R. E. Schafer
*Attorney, Agent, or Firm*—Young & Thompson

[57] ABSTRACT

A bearing material for dry operation of the sintered bronze type with a solid lubricant additive, particularly graphite, in a proportion amounting to 12 to 20%, and with at least one element selected from the group consisting of Titanium and a metal of Groups VI, VII and VIII of the Periodic System, present in a proportion of about 4 to 15% for increasing stability, the balance of the material being copper or a known bronze other than binary lead bronze.

2 Claims, No Drawings

BEARING MATERIAL FOR DRY OPERATION OF THE SINTERED BRONZE TYPE

SUMMARY OF THE INVENTION

The invention relates to a bearing material for dry operation, which is based upon sintered bronze, with an additive for increasing the stability and a solid lubricant additive, particularly graphite.

The choice of the optimum bearing or anti-friction material is particularly important for many technical products, since in the majority of cases faults which occur in bearings can lead to a sudden breakdown in the apparatus. This also applies to bearings which are only lubricated once during installation and wherein additional lubrication is not possible, for example in the food industry or with apparatus which is exposed to high temperatures at which known lubricants can no longer be used. Even extreme high-speed equipment, for example grinding spindles, gas centrifuges etc., do not allow lubrication by means of oils or grease.

In certain cases, so-called gas suspensions or floating bearings are used, which require bearing materials for dry operation with good emergency running properties, so that seizure is avoided. Very high demands are thus imposed on dry-running bearing materials, for during acceleration and braking direct contact between the materials of the bearing and the shaft cannot be avoided, because the supporting gas film is only formed at a minimum number of revolutions per unit time, dependent upon the method of construction. Wear and friction of the bearing material must therefore be very low, whilst its strength must be as high as possible.

The best of the previously known sintered bronze anti-friction materials for dry operation are the lead bronzes. These have satisfactory friction values, but their strength is not sufficient for all purposes. Thus for example, the stability of a known sintered lead bronze, consisting by weight of 80% Cu, 8% Pb and 12% C, with a Brinell Hardness (HB 2.5/2.5) of 23 kp/mm$^2$, is quite inadequate.

The invention is concerned with the problem of removing the previous disadvantages and of providing an anti-friction material for dry operation of the sintered-bronze type, which in addition to good wear and satisfactory friction values also has a satisfactory strength or stability.

This problem is solved by means of a bearing material for dry operation of the type initially described, of the sintered bronze type, with an additive for increasing stability and with a solid lubricant additive, particularly graphite, wherein according to the invention titanium and/or metal of Groups VI, VII and VIII of the Periodic System, in a proportion of about 4 to 15% b.w., is used as the first additive, and the proportion of solid lubricant present amounts to about 12 to 20% b.w., the balance of the material being copper or a known bronze other than binary lead bronze.

In general, it is a problem to incorporate in the anti-friction material the amount of lubricant necessary for achieving the desired low friction values, without impairing the resistance. Indeed, it is known that to increase the stability metals known in steel for the same purpose can be used with the bronzes, e.g., Co, Mo, Mn, Ni. However, in comparison with the known tin or lead bronzes, higher sintering temperatures are necessary to obtain a solution of these metals in copper. There is then the danger that, with a graphite proportion of 12% b.w. and more, the structure could then be so impaired that the stability behaviour of such systems becomes uncontrollable. It has surprisingly been found that sintered bronzes with these higher melting additives give mainly satisfactory results even with a high graphite proportion. With the anti-friction material according to the invention with a weight composition of 80% Cu, 5% Co, 15% C, friction speeds of 210 m/sec, the highest value which the testing apparatus, a gas-supported rotator, allows, were easily reached. As opposed to this with the previously known sintered bronze bearing materials, at the most about 170 m/sec could be achieved. The bearing materials according to the invention, with a density of 6 g/cm$^3$, had a Brinell hardness value (HB 2.5/2.5) of 35 kp/mm$^2$, as opposed to 23 kp/mm$^2$ with a known lead bronze dry material.

As opposed to the known materials of comparable kind, wherein a high resistance with a low friction value can possibly be achieved by hot pressing, the material according to the invention can be prepared by a comparatively simple common cold pressing method. In addition to the improved properties of use of the friction materials according to the invention, there are the additional advantages of a noticeable reduction in weihgt and a simplified and thus weight less expensive possibility of manufacture.

The preferred metals used as the additive for increasing the stability in the bearing materials according to the invention are preferably used in the following particle sizes:

Copper 10 – 500 μm, preferably 5 – 80 μm;
Manganese 3 – 200 μm, preferably 15 – 55 μm;
Nickel 3 – 200 μm, preferably 15 – 55 μm;
Cobalt 3 – 200 μm, preferably 15 – 55 μm;
Titanium 3 – 200 μm, preferably 15 – 55 μm;
Iron 5 – 300 μm, preferably 15 – 55 μm;
Graphite 1 – 1,000 μm, preferably 5 – 100 μm.

The general nature of the invention having been set forth, the following example is presented to illustrate but not to limit the preferred means for carrying out the invention.

EXAMPLE

Bearing materials according to the invention were produced from the above compositions as follows: The constituents were cold pressed in powder form of a predetermined particle size in the above ranges at a pressure in the range from 2 to 4 Mp/cm$^2$; they were then sintered at 600° to 800°C. They were subsequently re-pressed at a pressure of 2 to 4 Mp/cm$^2$ and finally sintered at a temperature of about 70% of the melting point of the main components, thus in the range of about 900° to 1,100°C. After sintering, they were finally pressed (calibrated) up to a residual porous volume of less than 10% with a pressing pressure in the range from 2 to 4 Mp/cm$^2$. The finished component was then available. This had in all cases a lower weight than the known sintered lead bronze anti-friction material and a satisfactory friction value with a high resistance, whereas with the known sintered bronze friction materials, a satisfactory friction value was only present with an unsatisfactory resistance.

Compositions of the bearing materials according to the invention:

| weight percent | | weight percent | |
|---|---|---|---|
| 1. 12–20 | C | 2. 12–20 | C |
| 4–15 | Co | 4–15 | Fe |

| | Weight percent | |
|---|---|---|
| 3. | Balance | Cu |
| | 12–20 | C |
| | 4–15 | Ni |
| 5. | Balance | Cu |
| | 12–20 | C |
| | 4–15 | Ti |
| 7. | Balance | Cu |
| | 12–20 | C |
| | 3–8 | Co |
| | 1–7 | Ni |
| 9. | Balance | Cu |
| | 12–20 | C |
| | 3–8 | Co |
| | 1–7 | Ti |
| 11. | Balance | Cu |
| | 12–20 | C |
| | 3–8 | Co |
| | 1–7 | W |
| | Balance | Cu |

| | Weight percent | |
|---|---|---|
| 4. | Balance | Cu |
| | 12–20 | C |
| | 4–15 | Mn |
| 6. | Balance | Cu |
| | 12–20 | C |
| | 3–8 | Co |
| | 1–7 | Fe |
| 8. | Balance | Cu |
| | 12–20 | C |
| | 3–8 | Co |
| | 1–7 | Mn |
| 10. | Balance | Cu |
| | 12–20 | C |
| | 3–8 | Co |
| | 1–4 | Fe |
| | 1–4 | Ni |
| 12. | Balance | Cu |
| | 12–20 | C |
| | 3–8 | Co |
| | 1–7 | Mo |
| | Balance | Cu |

The proportion of copper in these compositions can also be replaced by known bronzes, such as Cu SnAl, CuAl, CuSnP, CuSnZn, CuSnPb.

I claim:

1. A sintered bearing material for dry operation of the sintered bronze type containing a solid lubricant additive and consisting essentially of 12 – 20% by weight graphite, 4 – 15% by weight of at least one member selected from the group consisting of Co, Ni, Fe, Mn, Ti, Mo and W, balance essentially a known alloy composition selected from the group consisting of copper, CuSnAl, CuAl, CuSnP, CuSnZn and CuSnPb.

2. A sintered bearing material for dry operation of the sintered bronze type containing a solid lubricant additive and consisting essentially of about 80% by weight copper (particle size 5 – 80 μm), about 5% by weight cobalt (particle size 15 – 55 μm), and about 15% by weight graphite (particle size 5 – 100 μm).

* * * * *